(No Model.)

C. TABER.
PICTURE FRAME.

No. 374,641. Patented Dec. 13, 1887.

Witnesses
Fred. A. Mason
A. C. Fuller

Inventor
Charles Taber
by H. W. Mason atty.

UNITED STATES PATENT OFFICE.

CHARLES TABER, OF NEW BEDFORD, MASSACHUSETTS.

PICTURE-FRAME.

SPECIFICATION forming part of Letters Patent No. 374,641, dated December 13, 1887.

Application filed January 24, 1887. Serial No. 225,262. (No model.)

*To all whom it may concern:*

Be it known that I, CHARLES TABER, a citizen of the United States, residing at New Bedford, in the county of Bristol and State of Massachusetts, have invented a new and useful Improvement in the Method of Mounting Pictures on Frames or Plaques, of which the following is a specification.

The object of my invention is to produce new and beautiful effects in mounting pictures; and it consists in the peculiar manner of attaching the picture and glass to the frame or plaque, and in the peculiar construction of the frame in order that the picture and glass may be so attached or mounted.

Heretofore pictures have been mounted in frames or plaques by forming a rabbet in the inside edge of the same and putting the glass and picture in from the back side and securing it in place by means of a backing.

Figure 1:
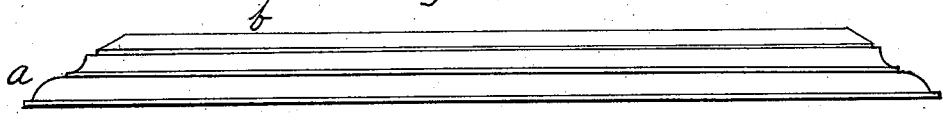
Figure 2:
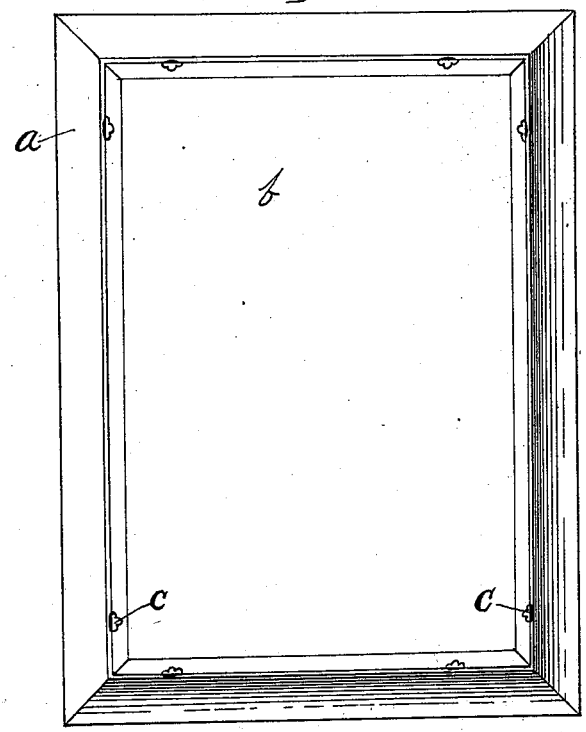

In the accompanying drawings, Figure 1 is a side view of a frame with the glass cemented to the front thereof. Fig. 2 is a front view of a frame with the glass attached by means of metallic fastenings.

In Fig. 1, $a$ represents the frame, and $b$ the glass, which has a beveled edge, and the extreme edge is also ground or polished, so as to present a finished appearance. This method of mounting a picture and glass on a frame or plaque is especially adapted to displaying the beauties of glass with beveled edges, as no part of the beveled edge is covered by the frame.

Fig. 2 shows the glass attached to the frame by means of metallic fasteners, which may be first attached to the frame, and after the glass is put in place, bent over the edge of the same, in order to retain it, and as an ornament to the edge; or the fastener may be nails with ornamental heads, to be driven into the frame along the edge of the glass, with the heads projecting over the edges of the glass.

In carrying out my invention I construct the frame or plaque with a flat or level portion at the point where the glass is to be attached. I also prefer to attach the picture to the glass by means of a transparent varnish or size before cementing or otherwise attaching the glass to the front of the frame.

Having thus described my invention, what I claim as new, and desire to secure by Letters Patent, is—

A picture-frame having its front inner edge flat and projecting to the front beyond the other portions of said frame, in combination with a glass having finished edges, attached to said projecting flat surface in such a manner that the edges of said glass are exposed to view, as shown and described.

CHARLES TABER.

Witnesses:
HENRY W. MASON,
THOS. M. JAMES.